(12) United States Patent
Chaubey et al.

(10) Patent No.: US 11,790,795 B2
(45) Date of Patent: Oct. 17, 2023

(54) SYSTEM AND METHODS ENABLING AIRCRAFT ENERGY DISSIPATION FOR RAPID DECISION MAKING

(71) Applicant: HONEYWELL INTERNATIONAL INC., Morris Plains, NJ (US)

(72) Inventors: Rajesh Chaubey, Bangalore (IN); Rajeev Mohan, Bangalore (IN); Daniel E. Lewis, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 331 days.

(21) Appl. No.: 16/890,614

(22) Filed: Jun. 2, 2020

(65) Prior Publication Data
US 2021/0319708 A1    Oct. 14, 2021

(30) Foreign Application Priority Data
Apr. 13, 2020    (IN) .............................. 202011015892

(51) Int. Cl.
*B64D 43/02*    (2006.01)
*G08G 5/02*    (2006.01)
*G06F 3/0482*    (2013.01)

(52) U.S. Cl.
CPC ............ *G08G 5/025* (2013.01); *B64D 43/02* (2013.01); *G06F 3/0482* (2013.01)

(58) Field of Classification Search
CPC ........ G08G 5/025; B64D 43/02; G06F 3/0482
See application file for complete search history.

(56) References Cited

U.S. PATENT DOCUMENTS

| | | |
|---|---|---|
| 7,925,394 B2 | 4/2011 | Deker et al. |
| 8,447,442 B2 | 5/2013 | Sacle et al. |
| 9,274,529 B2 | 3/2016 | Ben-Shachar et al. |
| (Continued) | | |

FOREIGN PATENT DOCUMENTS

WO    2015/101978 A1    7/2015

OTHER PUBLICATIONS

"Control your Speed . . . During Descent, Approach and Landing," Safety First #Aug. 24, 2017.
(Continued)

*Primary Examiner* — Aryan E Weisenfeld
*Assistant Examiner* — Jeffrey R Chalhoub
(74) *Attorney, Agent, or Firm* — Lorenz & Kopf LLP

(57) ABSTRACT

A method in an aircraft for energy reduction is disclosed. The method includes: determining a starting point location, altitude and airspeed for a stable approach for landing at a diversion airport; and determining a vertical strategy for achieving the starting point altitude and airspeed by identifying a region of opportunity for adjusting the speed and altitude and identifying a plurality of energy reduction strategies for achieving the starting point altitude and airspeed while in the region of opportunity based on a speed mode during the stable approach. The method further comprises causing a graphic display to be displayed that lists for selection each of the plurality of identified strategies, detailed maneuver information for strategy implementation, and costs for implementing each identified strategy; and causing to be displayed, responsive to flight crew selection, a lateral view and vertical view of a proposed trajectory based on a selected identified strategy.

20 Claims, 9 Drawing Sheets

(56) References Cited

U.S. PATENT DOCUMENTS

| | | | |
|---|---|---|---|
| 9,646,503 B2 | 5/2017 | Kawalkar et al. | |
| 9,709,991 B2 | 7/2017 | Bataillon et al. | |
| 10,134,289 B2 | 11/2018 | Moravek et al. | |
| 10,152,195 B2 | 12/2018 | Lacko et al. | |
| 10,410,529 B2 | 9/2019 | Chiodini et al. | |
| 2017/0243495 A1* | 8/2017 | Moravek | G08G 5/0091 |
| 2020/0273350 A1 | 8/2020 | Litvova et al. | |

OTHER PUBLICATIONS

Ayhan, Bulent, et al. "Preflight Contingency Planning Approach for Fixed Wing UAVs with Engine Failure in the Presence of Winds," Jan. 9, 2019.

Meuleau, Nicolas, et al., "The Emergency Landing Planner Experiment," NASA Ames Research Center, downloaded on Jan. 23, 2020.

* cited by examiner

FIG. 4

SYSTEM AND METHODS ENABLING AIRCRAFT ENERGY DISSIPATION FOR RAPID DECISION MAKING

CROSS REFERENCE TO RELATED APPLICATION

This application claims priority to Indian Provisional Patent Application No. 202011015892, filed Apr. 13, 2020, the entire content of which is incorporated by reference herein.

TECHNICAL FIELD

The present invention generally relates to safety systems during flight, and more particularly relates to a system and method for automatic diversion management.

BACKGROUND

Often, it is desirable to operate an aircraft in accordance with a stabilized approach when close to the airport (e.g., within a few miles and aligned with the runway) in order to land safely. The stabilized approach is generally defined in terms of a number of specific criteria, which may be set forth by a safety organization (e.g., the Flight Safety Foundation), a standards organization or other regulatory body, an airline, an aircraft manufacturer, or the like.

In situations where an aircraft needs to deviate from an original flight plan, such as in an emergency situation, achieving a stabilized approach to a diversion destination can be difficult due to the unplanned nature of the descent. Moreover, the time-sensitive nature of the aircraft operation in an emergency situation can increase the stress on the pilot, which, in turn, increases the likelihood of pilot error.

Hence, it is desirable to reduce the mental workload of the pilot and better facilitate safe descent for an aircraft, particularly in the event of a diversion from its original flight plan. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a processor-implemented energy reduction system on-board an aircraft is disclosed. The energy reduction system includes a controller including one or more processors configured by programming instructions on non-transitory computer readable media. The controller is configured to: determine a starting point location, altitude and airspeed for a stable approach for landing at a diversion location; and determine a lateral and vertical strategy for reaching the starting point location and achieving the starting point altitude and airspeed. To determine the vertical strategy the controller is further configured to identify a region of opportunity for adjusting the speed and altitude of the aircraft to achieve the starting point altitude and airspeed, wherein the region of opportunity is a region between the current aircraft location and the starting point location for the stable approach; and identify a plurality of energy reduction strategies for achieving the starting point altitude and airspeed while in the region of opportunity based on a speed mode for use by the aircraft during the stable approach. The controller is further configured to cause to be displayed, on a graphic display device, a graphic display that lists for flight crew selection each of the plurality of identified strategies, detailed maneuver information for strategy implementation for each of the plurality of identified strategies, and costs for implementing each of the plurality of identified strategies including fuel consumption and time; and cause, to be displayed on the graphic display device responsive to flight crew selection, a lateral view and vertical view of a proposed trajectory that graphically identifies a proposed lateral path and vertical path to a runway at the diversion location based on a selected strategy.

In another embodiment, a processor-implemented method in an aircraft for energy reduction is disclosed. The method includes: determining a starting point location, altitude and airspeed for a stable approach for landing at a diversion location; and determining a lateral and vertical strategy for reaching the starting point location and achieving the starting point altitude and airspeed. Determining the vertical strategy includes identifying a region of opportunity for adjusting the speed and altitude of the aircraft to achieve the starting point altitude and airspeed, wherein the region of opportunity is a region between the current aircraft location and the starting point location for the stable approach; and identifying a plurality of energy reduction strategies for achieving the starting point altitude and airspeed while in the region of opportunity based on a speed mode for use by the aircraft during the stable approach. The method further comprises causing to be displayed, on a graphic display device, a graphic display that lists for flight crew selection each of the plurality of identified strategies, detailed maneuver information for strategy implementation for each of the plurality of identified strategies, and costs for implementing each of the plurality of identified strategies including fuel consumption and time; and causing to be displayed, on the graphic display device responsive to flight crew selection, a lateral view and vertical view of a proposed trajectory that graphically identifies a proposed lateral path and vertical path to a runway at the diversion location based on a selected strategy.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 4 is a diagram depicting an example graphic display for providing the flight crew with a plurality of energy reduction strategies, in accordance with some embodiments;

DETAILED DESCRIPTION

Figure 1A:
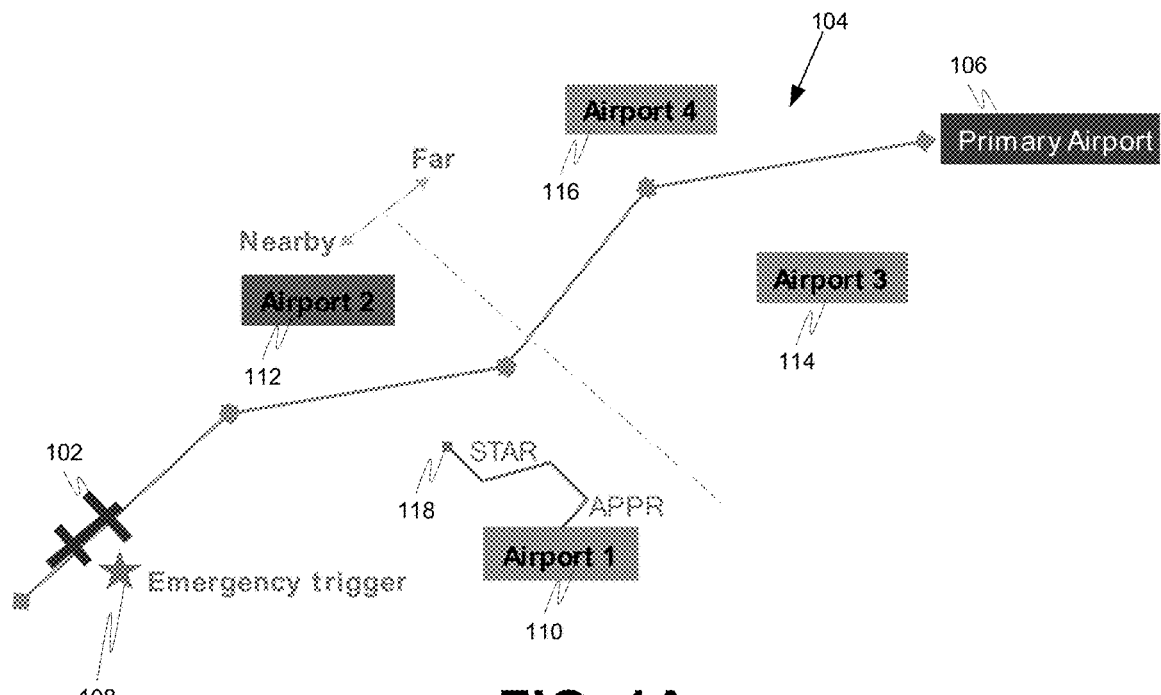
FIG. 1A depicts a flight scenario wherein an example aircraft is flying in a managed mode along a flight path toward a primary airport, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for providing a planned/strategic way of handling energy reduction when an aircraft diverts to a diversion location (e.g., diversion airport or other diversion aerodrome) due to a condition requiring diversion such as an emergency situation. The disclosed apparatus, systems, techniques and articles can provide increased capabilities to a flight management system (FMS) and/or similar device when incorporated therein. The disclosed apparatus, systems, techniques and articles can result in optimization of trajectory during a diversion to a diversion location. The disclosed apparatus, systems, techniques and articles can result in improved flight path management. The disclosed apparatus, systems, techniques and articles can result in cost and time savings for aircraft operators. For example, use of the disclosed apparatus, systems, techniques and articles can result in the avoidance of hard landings at a diversion airport and the associated inspection time, inspection costs, delays, and impact on other systems to manage energy (e.g., use of excess thrust reversal or airbrakes after touchdown) after a hard landing.

Figure 1B:
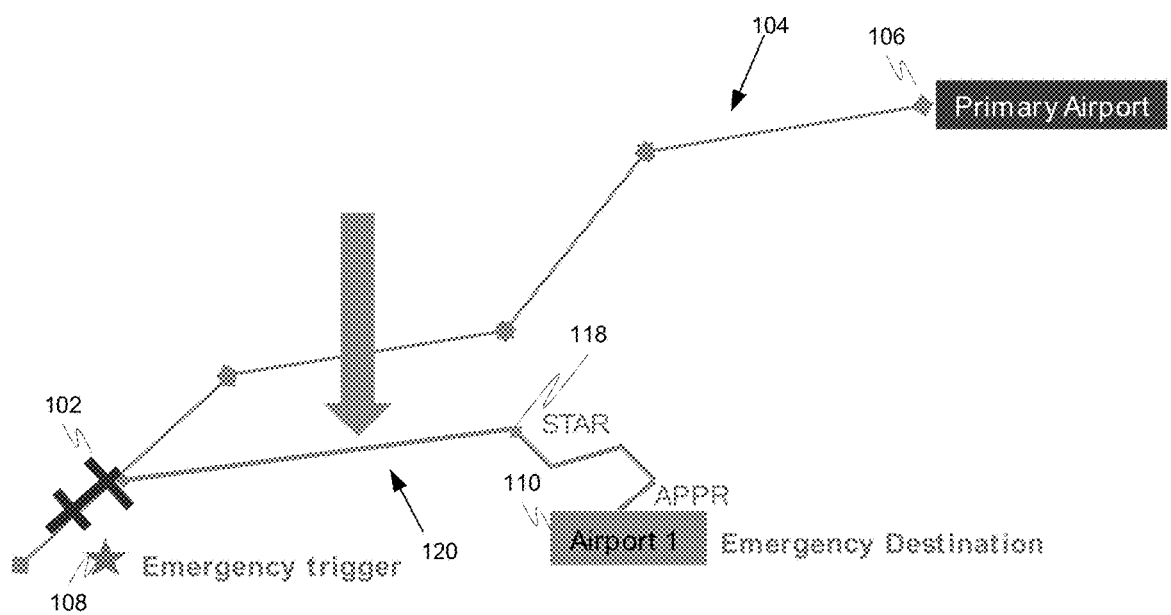
FIG. 1B depicts an example flight scenario wherein the example aircraft is flying in a managed mode along the flight path toward the primary airport and a diversion path to the diversion airport is calculated responsive to the emergency trigger, in accordance with some embodiments.

FIGS. 1A and 1B are diagrams depicting example flight scenarios. FIG. 1A depicts a flight scenario wherein an example aircraft 102 is flying in a managed mode along a flight path 104 toward a primary airport 106. When an emergency trigger 108 is detected, a diversion management system onboard the aircraft 102 evaluates airports 110, 112, 114, 116 along its flight path 104 to identify a diversion airport 110. Once a diversion airport 110 is identified, the diversion management system identifies a stable approach location 118 for a stable approach (e.g., DEST-STAR-APPR) to the diversion airport 110. In this example, the stable approach location 118 is the closest point backward from the new destination 110 where the aircraft 102 should initiate descent.

FIG. 1B depicts an example flight scenario wherein the example aircraft 102 is flying in a managed mode along the flight path 104 toward the primary airport 106 and a diversion path 120 to the diversion airport 110 is calculated responsive to the emergency trigger 108. In this example, the automatic diversion management system onboard the aircraft 102 after identifying the diversion airport 110 and identifying the stable approach location 118 for a stable approach (e.g., DEST-STAR-APPR) to the diversion airport 110 calculates a diversion path 120 for re-routing the aircraft 102 toward the diversion airport 110. The automatic diversion management system includes an energy reduction system for identifying and presenting to the flight crew, via a graphical display on a graphical display device in the aircraft, a plurality of available energy reduction strategies for reducing the aircraft altitude and airspeed before or by the time the aircraft 102 reaches the stable approach location 118 to allow for stable landing at the diversion airport 110. The flight crew may select for implementation one of the strategies presented by the energy reduction system wherein upon implementation of the selected strategy the aircraft 102 reaches the stable approach location 118 at an altitude and airspeed that allows for stable landing at the diversion airport 110.

Figure 2:
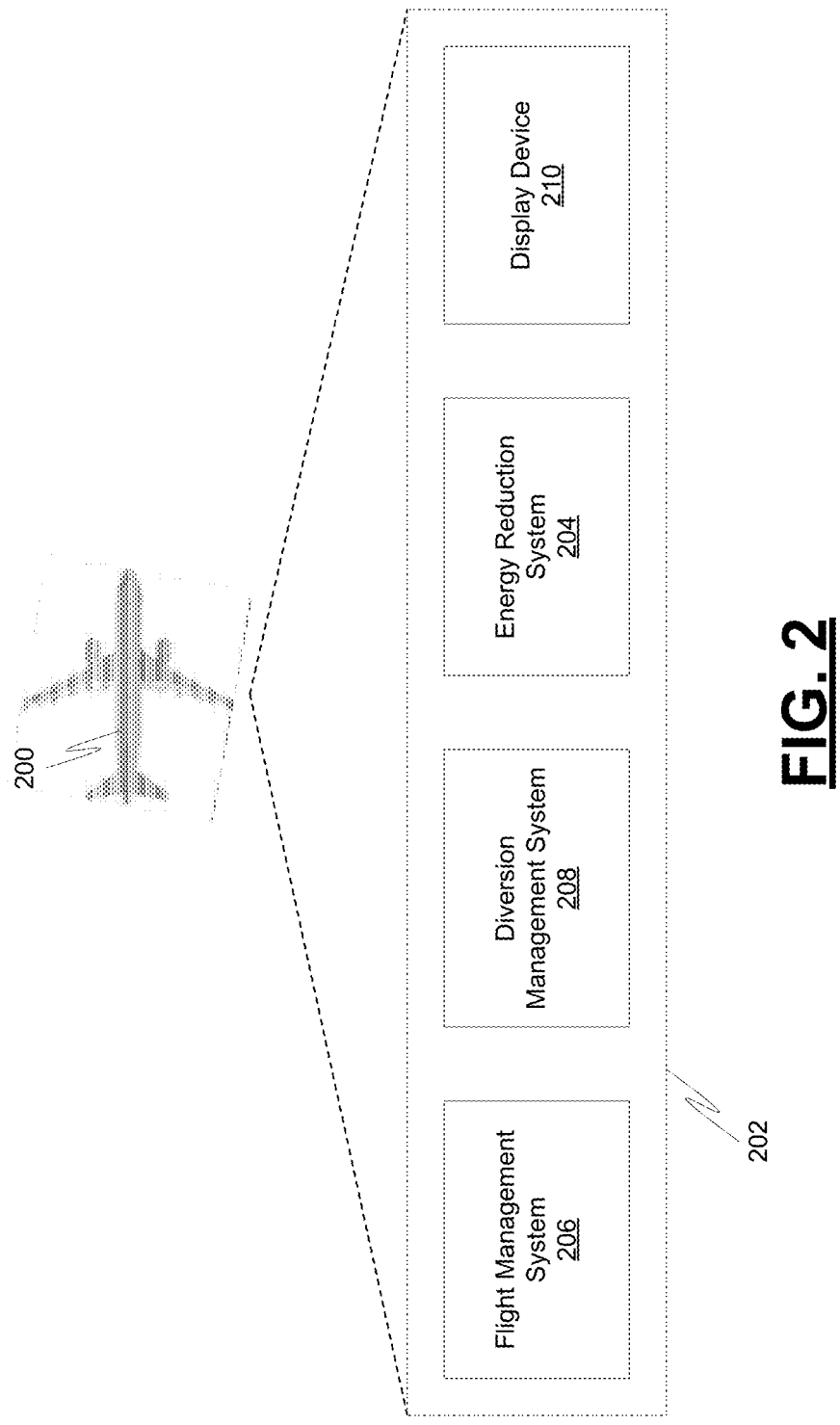
FIG. 2 is a block diagram depicting example flight deck equipment on an aircraft that implements an energy reduction system to provide flight crew during flight with a plurality of available energy reduction strategies for reducing aircraft altitude and airspeed before or by the time the aircraft reaches a stable approach location for a stable landing at a diversion location, in accordance with some embodiments.

FIG. 2 is a block diagram depicting example flight deck equipment 202 on an aircraft 200 that implements an energy reduction system 204 to provide flight crew during flight with a plurality of available energy reduction strategies for reducing aircraft altitude and airspeed before or by the time the aircraft 200 reaches a stable approach location for a stable landing at a diversion location (e.g., diversion airport or other diversion aerodrome). The example flight deck equipment 202 includes the energy reduction system 204, a flight management system (FMS) 206 (or similar system), a diversion management system 208, and a display device 210. The energy reduction system 204 and the diversion management system 208 may be implemented by the FMS 206, other avionics systems on the aircraft, or by systems carried onto the aircraft such as a personal electronic device (PED), smartphone, tablet computer, electronic flight bag, and other computing device, external to the FMS 206. Further the energy reduction system 204 may be integrated with the diversion management system 208 on the same hardware or on different hardware. The energy reduction system 204 and the diversion management system 208 are each implemented by a controller.

The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The diversion management system 208 is configured to identify or otherwise determine a diversion destination for the aircraft, when diversion is necessary. Example conditions that could cause a diversion include safety of flight conditions, an operational condition, or a service related condition. Examples of safety of flight conditions include pilot incapacitation, fire, smoke, major mechanical failure, natural disaster, and security. Examples of operational conditions include fuel (e.g., over burn or leak), ETOPS, weather at destination, ATC system constraint (e.g., required holding pattern), or runway obstruction. Examples of service related conditions include a medical need of a passenger or an unruly passenger. To identify or otherwise determine a diversion destination for the aircraft, the diversion management system 208 is configured to detect a need for a diversion, evaluate various airports nearby the flight path of the airplane requiring diversion to identify the airports that may serve as a possible new destination for landing, select an appropriate airport as the diversion airport, and generate a trajectory to the selected diversion airport.

After a diversion airport is selected, the energy reduction system 204 is configured to identify or calculate a stable approach location from which a stable landing can be achieved at the selected diversion airport, and identify and present to the flight crew, via a graphical display on the graphical display device 210 in the aircraft 200, a plurality of available energy reduction strategies for reducing the aircraft altitude and airspeed before or by the time the aircraft 200 reaches the stable approach location to allow for stable landing at the diversion airport. The flight crew may select for implementation one of the strategies presented by the energy reduction system 204 wherein upon implementation of the selected strategy the aircraft 200 reaches the stable approach location at an altitude and airspeed that allows for stable landing at the diversion airport. After a strategy is selected, the energy reduction system 204 may be configured to provide flight plan modifications for a flight plan stored by the FMS 206.

In one example, the energy reduction system 204 is configured to determine a stable approach location (e.g., location 118), altitude and airspeed for a stable approach for landing at a diversion airport (e.g., diversion airport 110); and determine a lateral and vertical strategy for reaching the stable approach location (e.g., location 118) and achieving an altitude and airspeed needed at the stable approach location. The stable approach may be a DEST-APPR-STAR (destination, approach, standard terminal arrival route) approach.

To determine the vertical strategy the energy reduction system 204 is further configured to identify a region of opportunity for adjusting the speed and altitude of the aircraft to achieve the altitude and airspeed, wherein the region of opportunity is a region between the current aircraft location and the starting point location for the stable approach. The energy reduction system 204 is further configured to identify a plurality of energy reduction strategies for achieving the altitude and airspeed needed at the stable approach location while in the region of opportunity based on a speed mode for use by the aircraft during the stable approach. The speed mode may be one of: best gliding speed, max sink rate speed, max angle speed, pilot entered speed, max flyable speed, and optimum speed.

To identify a plurality of energy reduction strategies, the energy reduction system 204 may be configured to: calculate whether the altitude and airspeed needed at the stable approach location can be achieved in the region of opportunity using each of a plurality of energy reduction strategies and calculate detailed maneuver information associated with each strategy that allows the altitude and airspeed needed at the stable approach location to be achieved in the region of opportunity. The plurality of energy reduction strategies may include a level deceleration strategy, a direct descent strategy, a spiral with one circuit strategy, a spiral with a plurality of circuits strategy, and a decelerate and spiral descent strategy. A spiral may be computed as version of a Holding pattern with an entry procedure (e.g., parallel, direct, teardrop) and variable racetrack length based on distance/time as well as variable turn radius based on adjustable bank angles within prescribed limits). The detailed maneuver information may comprise a specific energy reduction maneuver, a speed mode, a speed, and an amount of opportunity region used for the strategy. To identify a plurality of energy reduction strategies the energy reduction system 204 may be further configured to identify each strategy from the plurality of energy reduction strategies and the detailed maneuver information associated with each identified strategy that allows the altitude and airspeed needed at the stable approach location to be achieved in the region of opportunity. The energy reduction system 204 may also identify an energy reduction strategy that combines a plurality of energy reduction strategies.

The energy reduction system 204 is further configured to cause to be displayed, to flight crew on the display device 210, a graphic display that lists for flight crew selection each of the plurality of identified strategies, detailed maneuver information for strategy implementation for each of the plurality of identified strategies, and costs for implementing each of the plurality of identified strategies including fuel consumption and time. The energy reduction system 204 is further configured to cause, to be displayed to flight crew on the display device 210 responsive to flight crew selection, a lateral view and vertical view of a proposed trajectory that graphically identifies a proposed lateral path and vertical path to a runway at the diversion airport based on a selected identified strategy. The energy reduction system 204 is further configured to receive flight crew selection of one of the plurality of identified strategies for implementation and modify a flight plan with flight plan modifications to implement the strategy selected for implementation.

The energy reduction system 204 may be further configured to allow the flight crew to interactively modify a strategy before final selection through a user interface (e.g., expand, decrease the opportunity region, speed mode selection, spiral size, time, etc.). The energy reduction system 204 may provide feedback indicating whether safe flight is achievable with the modifications.

The energy reduction system 204 can be configured to send the flight plan modifications to the FMS 206 for implementation. When the energy reduction system 204 is implemented by the FMS 206, the energy reduction system 204 can be configured to modify a flight plan in the FMS 206 with the flight plan modifications.

FIGS. 3A-3E are diagrams illustrating energy reduction strategies that may be implemented in the region of opportunity for achieving an altitude and airspeed needed at the stable approach location to allow for a stable descent. The use of strategies depends on aircraft speed and altitude over distance to land. For example if a diversion causing event occurs while an aircraft is flying at Mach 0.82 at 40,000 feet altitude, the aircraft may need to decelerate first, next begin a descent, and then begin very large circuits while decreasing speed and altitude until reaching the altitude and airspeed needed at the stable approach location to allow for a stable descent. If a diversion causing event occurs while the aircraft is flying at 280 kts at 22,000 feet altitude, the aircraft may either utilize a decelerate then descend strategy or begin a descent with an appropriate spiral to achieve the altitude and airspeed needed at the stable approach location to allow for a stable descent.

Figure 3C:
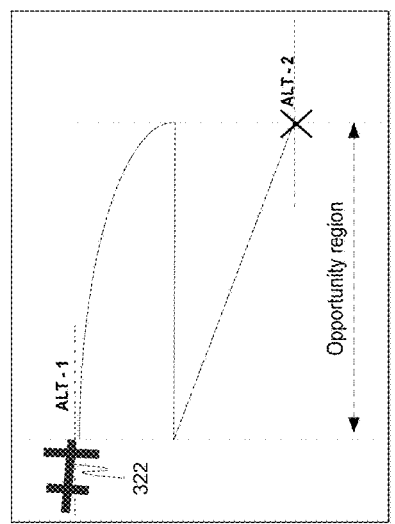
FIG. 3C illustrates a spiral with one circuit strategy, in accordance with some embodiments.
Figure 3E:
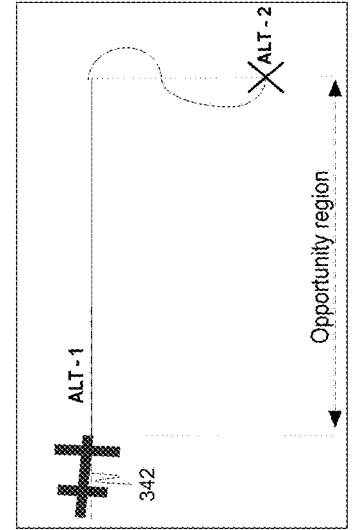
FIG. 3E illustrates a decelerate and spiral descent strategy, in accordance with some embodiments.
Figure 3A:
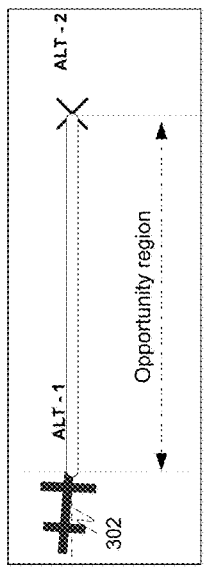
FIG. 3A illustrates a level deceleration strategy, in accordance with some embodiments.

FIG. 3A illustrates a level deceleration strategy. This strategy may be utilized when speed reduction, but not significant altitude reduction, is needed. With this strategy, the aircraft 302 will start deceleration from ALT-1 (current aircraft altitude) and decelerate for a percentage of the speed change needed until it reaches ALT-2 (altitude needed at the stable approach location), and then decelerate for the remaining percentage of speed change needed from ALT-2 to ALT-1.

Figure 3B:
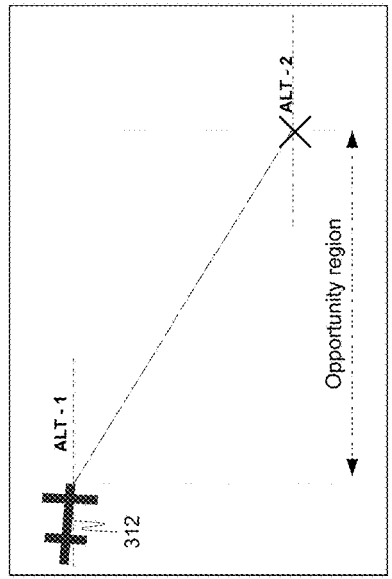
FIG. 3B illustrates a direct descent strategy, in accordance with some embodiments.

FIG. 3B illustrates a direct descent strategy. This strategy may be utilized to reduce altitude only, to reduce speed only, or to reduce both speed and altitude within an opportunity region. This strategy can be applied when it results in the aircraft 312 achieving the desired state (airspeed and/or altitude) at ALT-2.

FIG. 3C illustrates a spiral with one circuit strategy. This strategy may be utilized to reduce altitude only, to reduce speed only, or to reduce both speed and altitude within an opportunity region. This strategy can be applied if the aircraft 322, using the direct descent strategy, is unable to achieve the desired state at ALT-2.

Figure 3D:
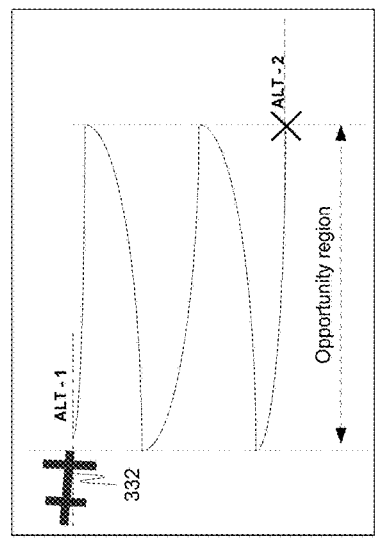
FIG. 3D illustrates a spiral with a plurality of circuits strategy, in accordance with some embodiments.

FIG. 3D illustrates a spiral with a plurality of circuits strategy. This strategy may be utilized to reduce altitude only, to reduce speed only, or to reduce both speed and altitude within an opportunity region. This strategy can be applied if the aircraft 332, using the direct descent strategy or the spiral with one circuit strategy, is unable to achieve the desired state at ALT-2.

FIG. 3E illustrates a decelerate and spiral descent strategy. This strategy may be utilized to reduce speed first and then to reduce altitude within an opportunity region. This strategy can be applied if gliding speed can help the aircraft 342 to reduce the altitude.

Figure 4:
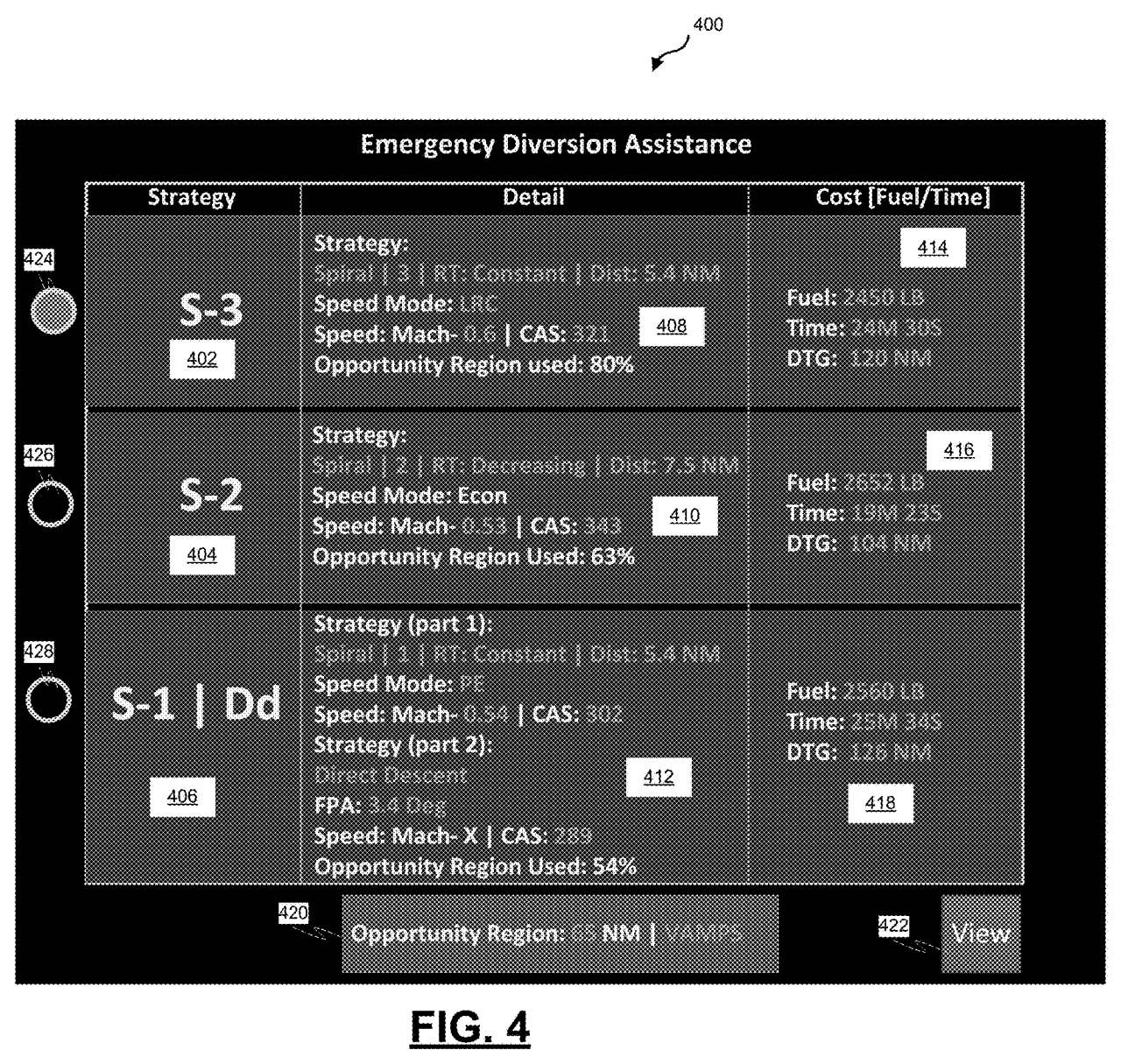

FIG. 4 is a diagram depicting an example graphic display 400 for providing the flight crew with a plurality of energy reduction strategies. In the example graphic display 400, three strategies are identified: S-3 (402); S-2 (404), and S-1|Dd (406). For each strategy, detailed maneuver information (408, 410, 412) is provided. The detailed maneuver information for the strategy includes identifying the strategy, speed mode, speed, and percentage of opportunity region used. Also, for each strategy, strategy implementation costs (414, 416, 418) are provided. The strategy implementation costs include the fuel consumption, implementation time for the strategy and the DTG (distance-to-go).

In this example, strategy S-3 (402), as the name implies, involves a spiral with three circuits. As identified in the detailed maneuver information (408) the strategy involves a spiral with 3 circuits, a constant RT (radius-of-turn), and a distance of 5.4 NM (nautical miles) for each spiral circuit. The identified speed mode is LRC (long range cruise). The speed identifies the speed reduction to be achieved of Mach 0.6 and the CAS (corrected airspeed) of 321. The identified percentage of opportunity region used for this strategy is 80%. As identified by the strategy implementation costs (414), the fuel consumed consists of 2450 pounds, the time to complete the strategy is 24 minutes 30 seconds, and the DTG is 120 NM.

In this example, strategy S-2 (404), as the name implies, involves a spiral with two circuits. As identified in the detailed maneuver information (410) the strategy involves a spiral with 2 circuits, a decreasing RT, and a distance of 7.5 NM for each spiral circuit. The identified speed mode is ECON (economy). The speed identifies the speed reduction to be achieved of Mach 0.53 and the CAS of 343. The identified percentage of opportunity region used for this strategy is 63%. As identified by the strategy implementation costs (416), the fuel consumed consists of 2652 pounds, the time to complete the strategy is 19 minutes 23 seconds, and the DTG is 104 NM.

In this example, strategy S-1|Dd (406), as the name implies, involves a two-part strategy: a spiral with one circuit followed by a direct descent. As identified in the detailed maneuver information (412), the strategy for the first part includes a spiral with 1 circuit, a constant RT, and a distance of 5.4 NM (nautical miles) for each spiral circuit. The identified speed mode is PE (Pilot Entered speed in FMS or Selected in Mode Control Panel or Flight Control Panel). The speed identifies the speed reduction to be achieved of Mach 0.54 and the CAS of 302. The strategy for the second part identified in the detailed maneuver information (412) includes a direct descent. The FPA (flight path angle) is 3.4 degrees. The speed identifies a CAS of 289. The identified percentage of opportunity region used for the combined strategies is 54%. As identified by the strategy implementation costs (418), the fuel consumed consists of 2560 pounds, the time to complete the strategy is 25 minutes 34 seconds, and the DTG is 126 NM.

The graphic display 400 also shows the length of the opportunity region, 65 NM in this example, via a graphical element 420. The graphic display 400 also includes a view selection graphical element 422 that allows a flight crew member, upon selection of one of the plurality of energy reduction strategies via an energy reduction strategy selection graphical element (424, 426, 428) and selection of the view selection graphical element 422, to view a graphical display that provides lateral and vertical views of a selected energy reduction strategy.

Figure 5:
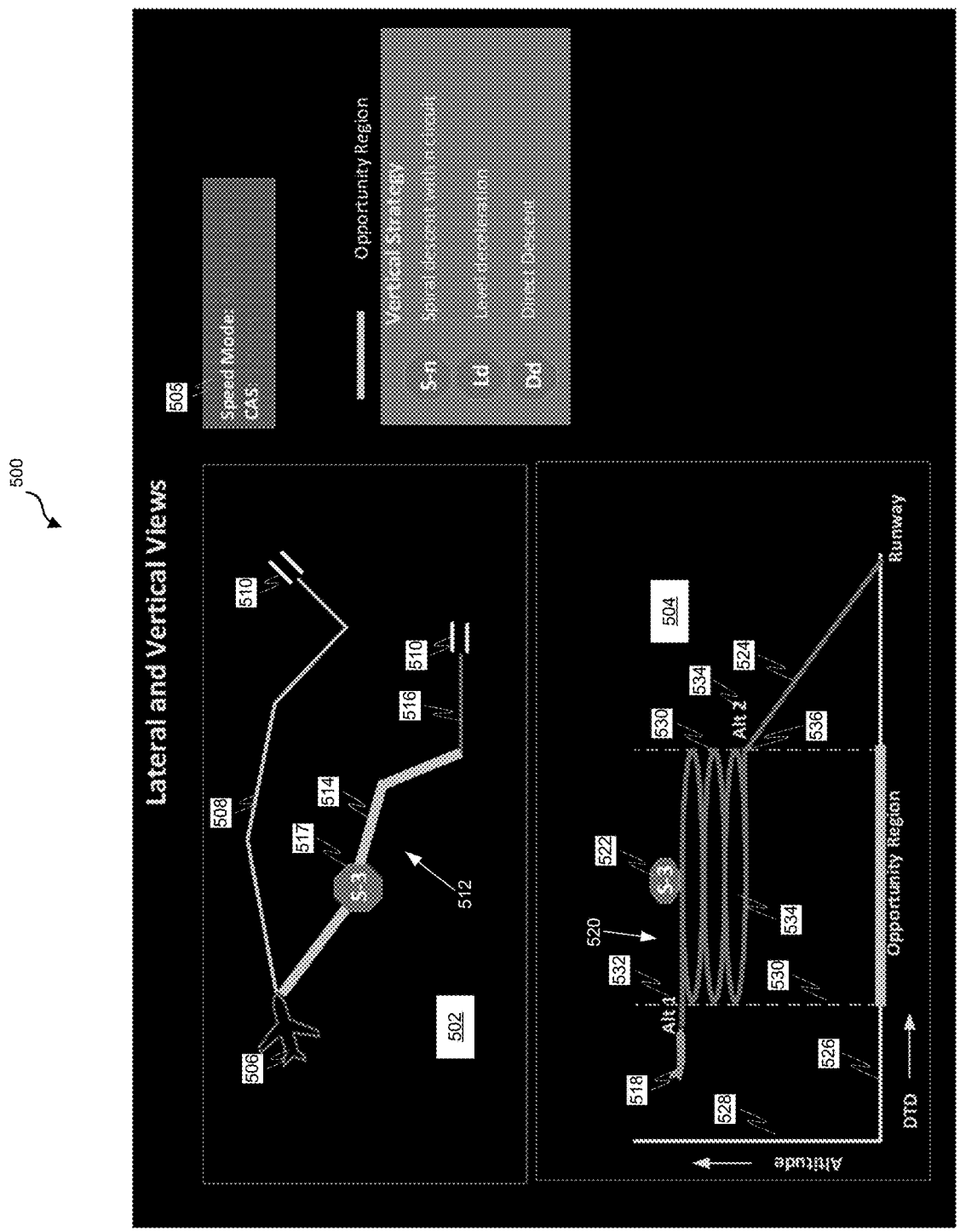
FIG. 5 is a diagram depicting an example graphic display that provides a lateral view and a vertical view for a selected energy reduction strategy, in accordance with some embodiments.

FIG. 5 is a diagram depicting an example graphic display 500 that provides a lateral view 502 and a vertical view 504 for a selected energy reduction strategy. The example graphic display 500 also provides a graphical element 505 that provides an indication of the speed mode and the CAS for the selected energy reduction strategy.

The lateral view 502 includes an aircraft icon 506, a lateral path 508 to a runway 510 at the diversion airport, and a vertical path 512 to the runway 510. The vertical path 512 includes a leg 514 in which a selected energy reduction strategy is implemented and a leg 516 during which stable descent is implemented. The vertical path 512 also includes a graphical element 517 that identifies the selected energy reduction strategy (S-3 for spiral with three circuits in this example).

The vertical view 504 includes an aircraft icon 518, a path segment 520 that illustrates the selected energy reduction strategy including a graphical element 522 that identifies the selected energy reduction strategy (S-3 for spiral with three circuits in this example), and a path segment 524 that illustrates a stable descent to a runway. The vertical view 504 includes a graph with the DTD on one axis 526 and the altitude on the other axis 528. The opportunity region is illustrated on the DTD axis 526 by highlighting and vertical dashed lines 530 extending vertically from the DTD axis 526. The vertical view 504 also provides a graphical element 532 for the current altitude and a graphical element 534 for the starting altitude at a stable descent point 536.

Figure 6:
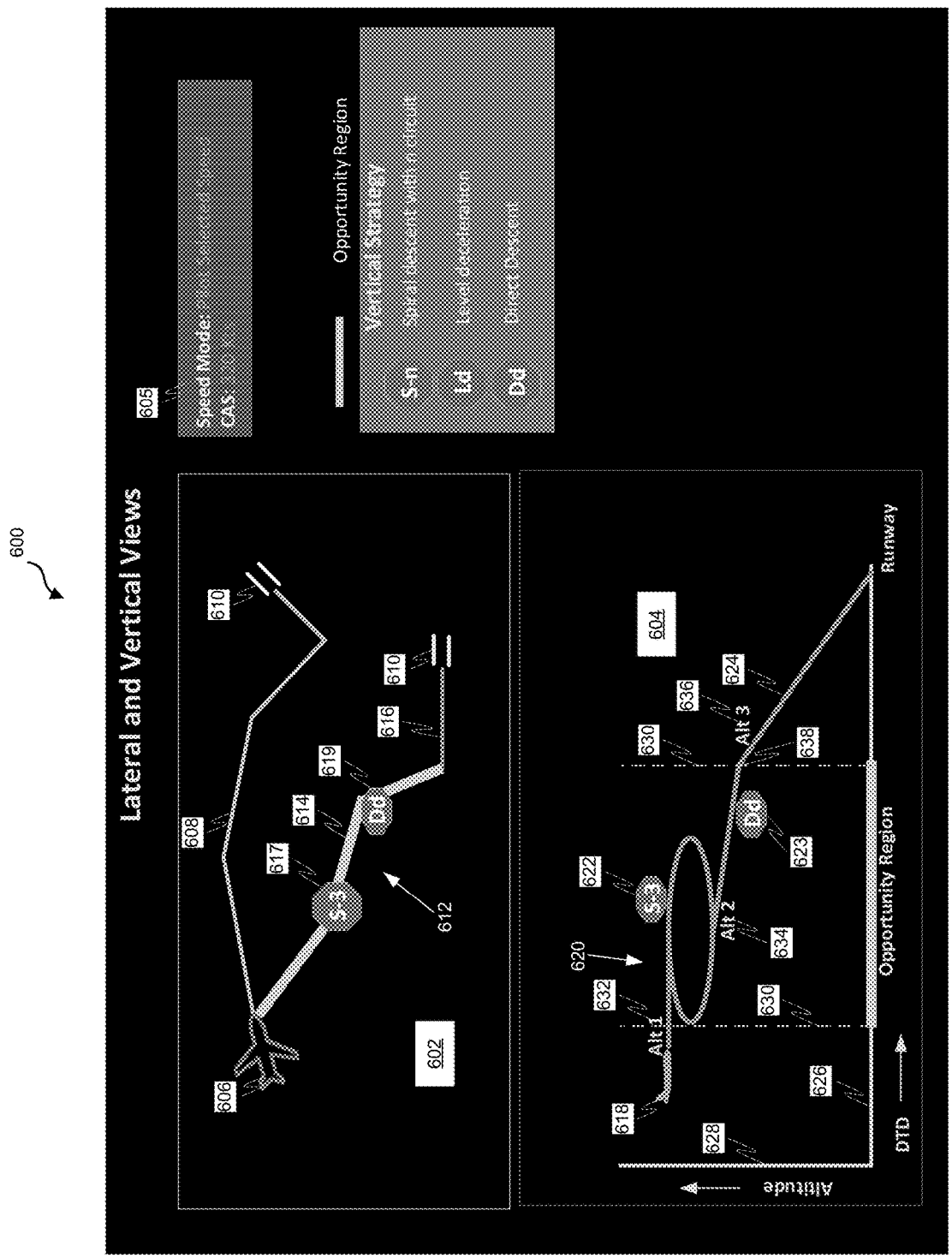
FIG. 6 is a diagram depicting another example graphic display for that provides a lateral view and a vertical view for a selected energy reduction strategy, in accordance with some embodiments.

FIG. 6 is a diagram depicting another example graphic display 600 for that provides a lateral view 602 and a vertical view 604 for a selected energy reduction strategy. The example graphic display 600 also provides a graphical element 605 that provides an indication of the speed mode and the CAS for the selected energy reduction strategy.

The lateral view 602 includes an aircraft icon 606, a lateral path 608 to a runway 610 at the diversion airport, and a vertical path 612 to the runway 610. The vertical path 612 includes a leg 614 in which a selected energy reduction strategy is implemented and a leg 616 during which stable descent is implemented. The vertical path 612 also includes graphical elements 617, 619 that identify the selected energy reduction strategy (S-3 for spiral with three circuits followed by a Dd for direct descent in this example).

The vertical view 604 includes an aircraft icon 618, a path segment 620 that illustrates the selected energy reduction strategy including graphical elements 622, 623 that identifies the selected energy reduction strategy (S-3 for spiral with three circuits and Dd for direct descent in this example), and a path segment 624 that illustrates a stable descent to a runway. The vertical view 604 includes a graph with the DTD on one axis 626 and the altitude on the other axis 628. The opportunity region is illustrated on the DTD axis 626 by highlighting and vertical dashed lines 630 extending vertically from the DTD axis 626. The vertical view 604 also provides a graphical element (Alt1) 632 for the current altitude, a graphical element (Alt2) 634 for the altitude at the conclusion of the first part and beginning of the second part of the energy reduction strategy in the opportunity region, and a graphical element 636 for the starting altitude at a stable descent point 638.

Figure 7:
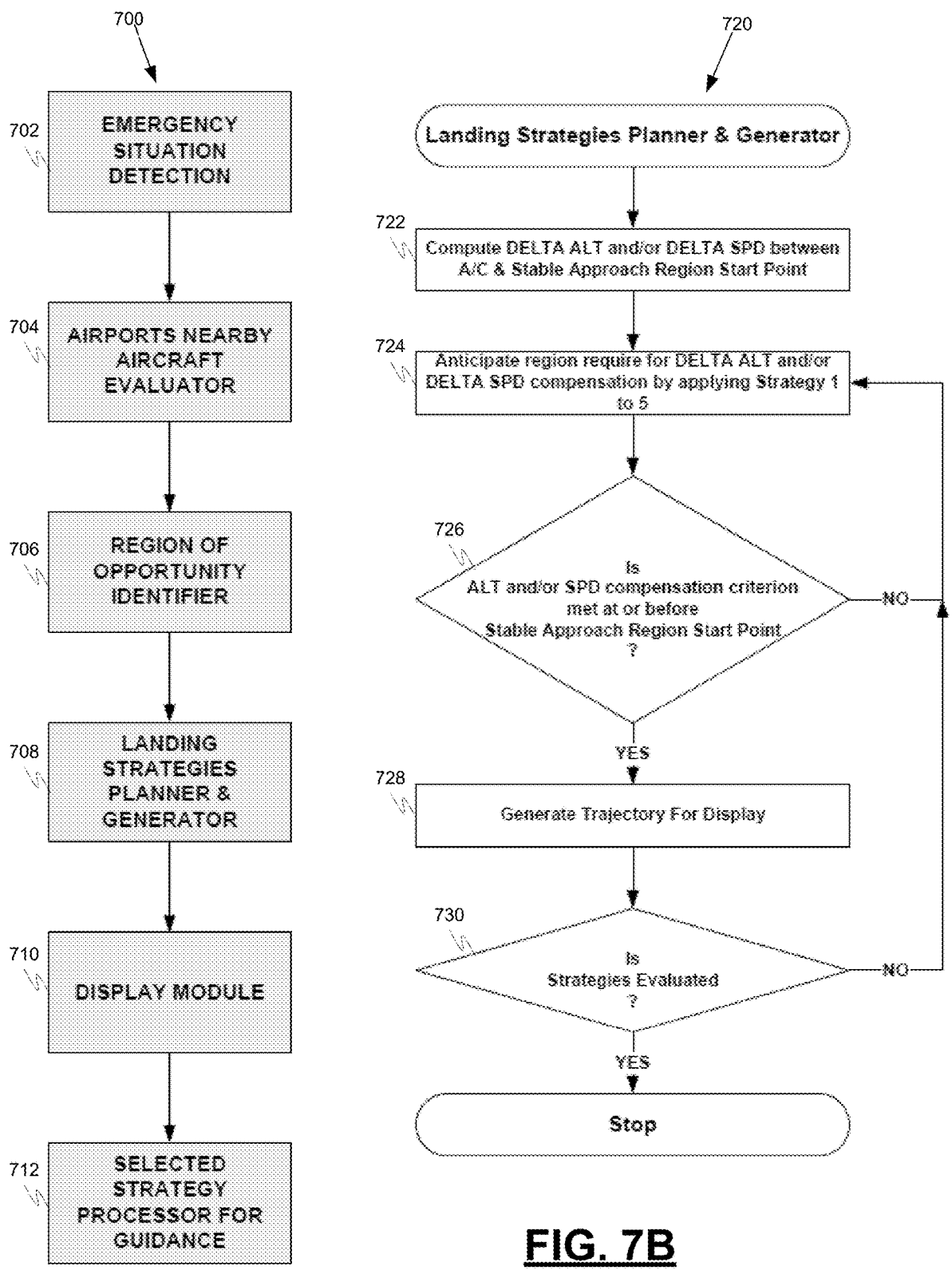
FIG. 7A is a process flow chart depicting an example process in a diversion management system, in accordance with some embodiments.
FIG. 7B is a process flow chart depicting an example process in a landing strategies planner and generator for generating an energy reduction strategy, in accordance with some embodiments.

FIG. 7A is a process flow chart depicting an example process 700 in a diversion management system. The example process 700 includes detecting a situation (e.g., an emergency situation) requiring diversion (operation 702). Next, an airports nearby aircraft evaluator determines whether any of the nearby airports can be a diversion airport and selects the best diversion airport (operation 704). Next, a region of opportunity identifier identifies the region of opportunity for achieving a speed and altitude to enable a stable descent to a runway at the diversion airport (operation 706). A landing strategies planner and generator identifies a plurality of energy reduction strategies for selection and use by the flight crew in reducing the altitude and speed of the aircraft by the stable descent point to allow for stable descent to a runway at the diversion airport (operation 708). The identified plurality of energy reduction strategies are displayed to the flight crew using a display module (operation 710). Finally, after flight crew selection of an energy reduction strategy, a selected strategy processor provides guidance to the flight crew during execution of the selected energy reduction strategy (712).

FIG. 7B is a process flow chart depicting an example process 720 in a landing strategies planner and generator for generating an energy reduction strategy. The example process 720 includes computing the change in altitude and/or change in speed from the current aircraft position to that required at the stable approach region start point (operation 722). Next, the process 720 includes anticipating/calculating a region required for a change in altitude and/or change in speed compensation to meet the starting altitude and/or speed requirements at the stable approach region start point when applying one of the plurality of energy reduction strategies 1-5 (operation 724). The plurality of energy reduction strategies may include a level deceleration strategy, a direct descent strategy, a spiral with one circuit strategy, a spiral with a plurality of circuits strategy, and a decelerate and spiral descent strategy. Next, the process 720 includes determining if the altitude and/or speed compensation criterion would be met at or before the stable approach region start point if the calculated energy reduction strategy were applied (decision 726). If the altitude and/or speed compensation criterion would not be met at or before the stable approach region start point (no at decision 726), then the process continues with operation 724 for another reduction strategy. If the altitude and/or speed compensation criterion would be met at or before the stable approach region start point (yes at decision 726), then the process includes generating a trajectory for display to flight crew (operation 728).

After generating the trajectory, the process includes determining if all strategies available for consideration have been evaluated (decision 730). If all strategies available for consideration have not been evaluated (no at decision 730), then the process continues with operation 724 for another reduction strategy. If all strategies available for consideration have been evaluated (yes at decision 730), then the process ends.

Figure 8:
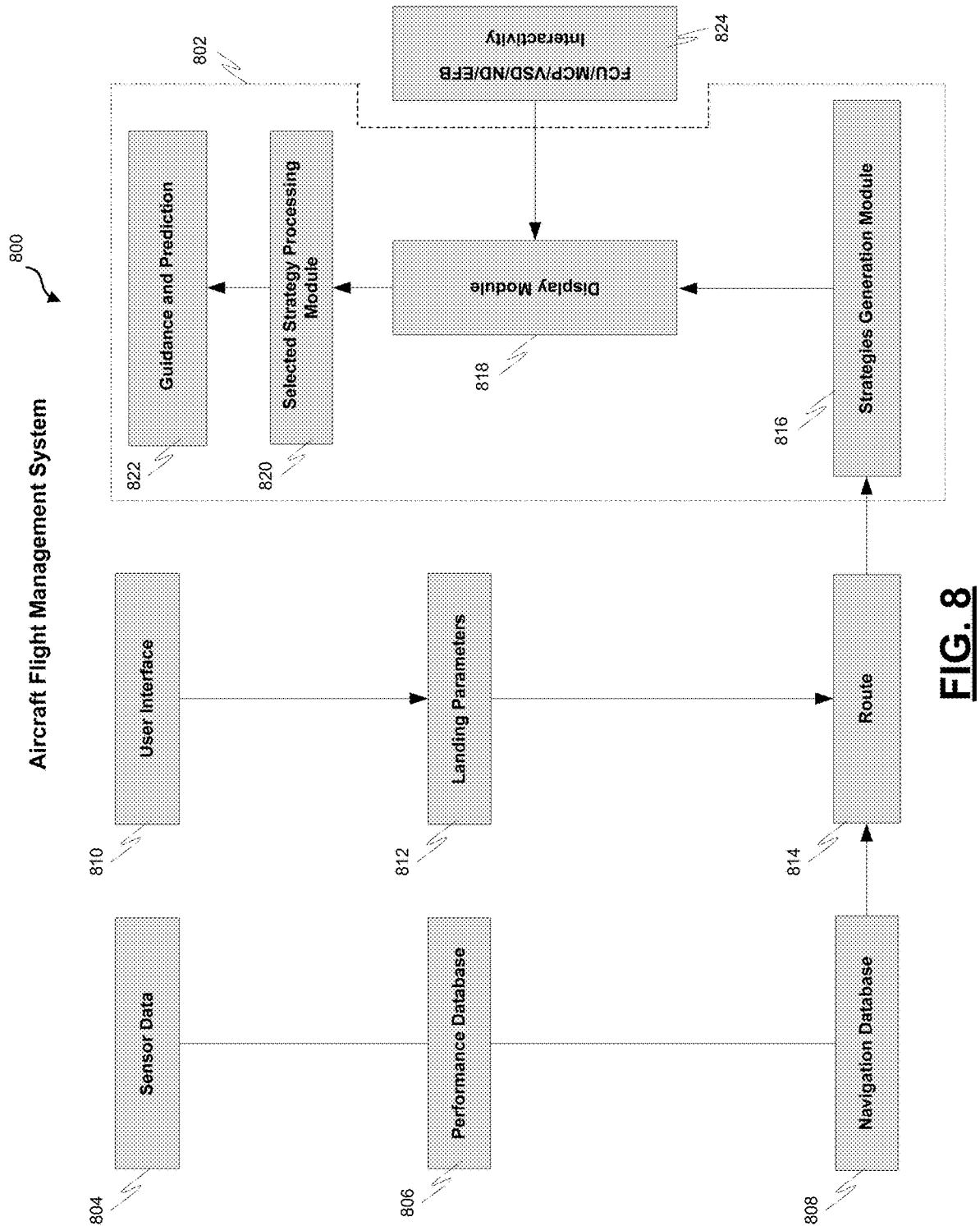
FIG. 8 is a block diagram depicting an example FMS that implements an energy reduction system, in accordance with some embodiments.

FIG. 8 is a block diagram depicting an example FMS 800 that implements an energy reduction system 802. The example FMS 800 is configured to retrieve sensor data 804 such as wind speed, airspeed, and aircraft altitude data, aircraft performance data for trajectory computation from a performance database 806, navigation data such as approach procedures for nearby airports or flight plan from a navigation database 808, user inputted data such as speed mode from a user interface 810, landing parameters 812, and route information 814.

The example energy reduction system 802 includes a strategies generation module 816 for determining strategies for dissipating energy, a display module 818 for generating a display of the strategies wherein a flight crew member can select a displayed strategy for detailed viewing and/or for use, and a selected strategy processing module 820 for generating flight plan changes based on a selected strategy. The example energy reduction system 802 is further configured to provide guidance and assistance 822 to the flight crew during implementation of a selected strategy. A flight control panel 824 within the cockpit can be used for displaying and/or receiving flight crew selection of a strategy for detailed viewing and/or use.

Figure 9:
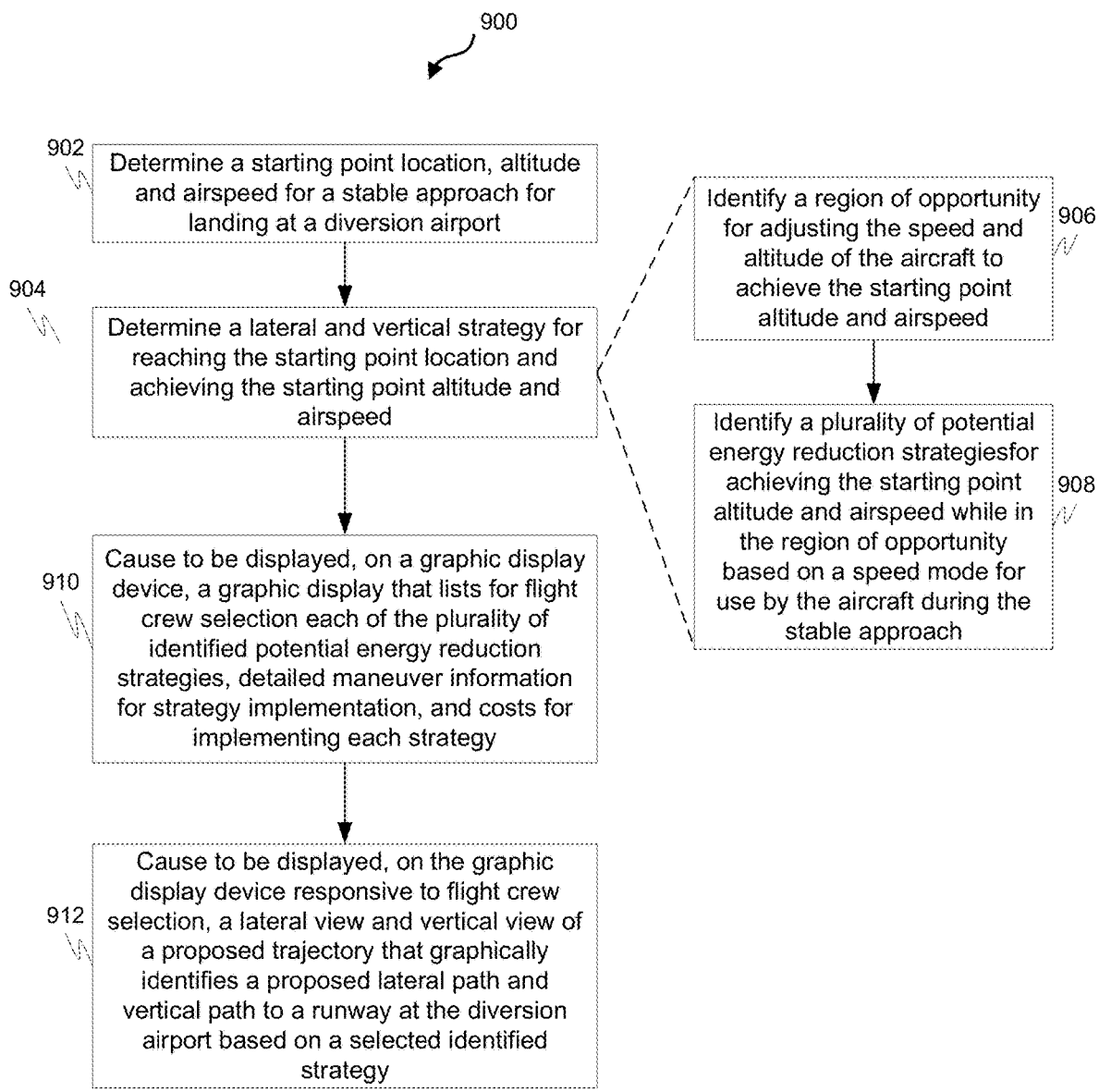
FIG. 9 is a process flow chart depicting an example processor-implemented method in an aircraft for flight energy management, in accordance with some embodiments.

FIG. 9 is a process flow chart depicting an example processor-implemented method in an aircraft for flight energy management. The order of operation within the process 900 is not limited to the sequential execution as illustrated in the figure, but may be performed in one or more varying orders as applicable and in accordance with the present disclosure.

The example process 900 includes determining a starting point location, altitude and airspeed for a stable approach for landing at a diversion airport (operation 902) and determining a lateral and vertical strategy for reaching the starting point location and achieving the starting point altitude and airspeed (operation 904). Determining the vertical strategy comprises identifying a region of opportunity for adjusting the speed and altitude of the aircraft to achieve the starting point altitude and airspeed (operation 906), wherein the region of opportunity is a region between the current aircraft location and the starting point location for the stable approach; and identifying a plurality of energy reduction strategies for achieving the starting point altitude and airspeed while in the region of opportunity based on a speed mode for use by the aircraft during the stable approach (operation 908).

The example process 900 includes causing to be displayed, to flight crew on a graphic display device, a graphic display that lists for flight crew selection each of the plurality of identified energy reduction strategies, detailed maneuver information for strategy implementation for each of the plurality of identified energy reduction strategies, and costs for implementing each of the plurality of identified energy reduction strategies including fuel consumption and time (operation 910). The example process 900 may further comprise receiving flight crew input that interactively modifies an energy reduction strategy before final selection through a user interface (e.g., expand, decrease the opportunity region, speed mode selection, spiral size, time, etc.) and providing feedback indicating whether safe flight is achievable with the modifications The example process 900 further includes causing to be displayed, to flight crew on the graphic display device, responsive to flight crew selection, a lateral view and vertical view of a proposed trajectory that graphically identifies a proposed lateral path and vertical path to a runway at the diversion airport based on a selected identified strategy (operation 912).

Described herein are apparatus, systems, techniques and articles for providing a flight crew with energy reduction strategies when an aircraft is diverted to a diversion landing point.

In one embodiment, a processor-implemented energy reduction system on-board an aircraft is provided. The energy reduction system includes a controller comprising one or more processors configured by programming instructions on non-transitory computer readable media. The controller is configured to: determine a starting point location, altitude and airspeed for a stable approach for landing at a diversion location (e.g., diversion airport); and determine a lateral and vertical strategy for reaching the starting point location and achieving the starting point altitude and airspeed. To determine the vertical strategy the controller is further configured to identify a region of opportunity for adjusting the speed and altitude of the aircraft to achieve the starting point altitude and airspeed, wherein the region of opportunity is a region between the current aircraft location and the starting point location for the stable approach; and identify a plurality of energy reduction strategies for achieving the starting point altitude and airspeed while in the region of opportunity based on a speed mode for use by the aircraft during the stable approach. The controller is further configured to cause to be displayed, to flight crew on a graphic display device, a graphic display that lists for flight crew selection each of the plurality of identified strategies, detailed maneuver information for strategy implementation for each of the plurality of identified strategies, and costs for implementing each of the plurality of identified strategies including fuel consumption and time; and cause, to be displayed to flight crew on the graphic display device responsive to flight crew selection, a lateral view and vertical view of a proposed trajectory that graphically identifies a proposed lateral path and vertical path to a runway at the diversion location based on a selected strategy.

These aspects and other embodiments may include one or more of the following features. The stable approach may comprise a DEST-APPR-STAR (destination, approach, standard terminal arrival route). To identify a plurality of energy reduction strategies the controller may be configured to: calculate whether the starting point speed and starting point altitude can be achieved in the region of opportunity using each of a plurality of energy reduction strategies and calculate detailed maneuver information associated with each strategy that allows the starting point speed and starting point altitude to be achieved in the region of opportunity, wherein the plurality of energy reduction strategies include a level deceleration strategy, a direct descent strategy, a spiral with one circuit strategy, a spiral with a plurality of circuits strategy, and a decelerate and spiral descent strategy. To identify a plurality of energy reduction strategies the controller may be further configured to identify each strategy from the plurality of energy reduction strategies and the detailed maneuver information associated with each identified strategy for which the starting point speed and starting point altitude can be achieved in the region of opportunity. The detailed maneuver information may comprise a specific energy reduction maneuver, a speed mode, a speed, and an amount of opportunity region used for the strategy. The speed mode may be one of: best gliding speed, max sink rate speed, max angle speed, pilot entered speed, max flyable speed, and optimum speed. The controller may be further configured to: receive flight crew selection of one of the plurality of identified strategies for implementation; and modify a flight plan with flight plan modifications to implement the strategy selected for implementation. The energy reduction system may be implemented by a personal electronic device, electronic flight bag, tablet computer, or other computing device external to an aircraft flight management system and the controller may be configured to send the flight plan modifications to the aircraft flight management system for implementation. The energy reduction system may be implemented by an aircraft flight management system and the controller may be configured to modify a flight plan in the aircraft flight management system with the flight plan modifications for implementation. The energy reduction system may be further configured to allow the flight crew to interactively modify a strategy before final selection through a user interface (e.g., expand, decrease the opportunity region, speed mode selection etc.) with the energy reduction system providing feedback indicating whether safe flight is achievable with the modifications.

In another embodiment, a processor-implemented method in an aircraft for energy reduction is provided. The method comprises: determining a starting point location, altitude and airspeed for a stable approach for landing at a diversion location (e.g., a diversion airport); and determining a lateral and vertical strategy for reaching the starting point location and achieving the starting point altitude and airspeed. Determining the vertical strategy comprises identifying a region of opportunity for adjusting the speed and altitude of the aircraft to achieve the starting point altitude and airspeed, wherein the region of opportunity is a region between the current aircraft location and the starting point location for the stable approach; and identifying a plurality of energy reduction strategies for achieving the starting point altitude and airspeed while in the region of opportunity based on a speed mode for use by the aircraft during the stable approach. The method further comprises causing to be displayed, to flight crew on a graphic display device, a graphic display that lists for flight crew selection each of the plurality of identified strategies, detailed maneuver information for strategy implementation for each of the plurality of identified strategies, and costs for implementing each of the plurality of identified strategies including fuel consumption and time; and causing to be displayed, to flight crew on the graphic display device responsive to flight crew selection, a lateral view and vertical view of a proposed trajectory that graphically identifies a proposed lateral path and vertical path to a runway at the diversion location based on a selected strategy.

These aspects and other embodiments may include one or more of the following features. The stable approach may comprise a DEST-APPR-STAR (destination, approach, standard terminal arrival route). Identifying a plurality of energy reduction strategies may comprise: calculating whether the starting point speed and starting point altitude can be achieved in the region of opportunity using each of a plurality of energy reduction strategies and calculating detailed maneuver information associated with each strategy that allows the starting point speed and starting point altitude to be achieved in the region of opportunity, wherein the plurality of energy reduction strategies include a level deceleration strategy, a direct descent strategy, a spiral with one circuit strategy, a spiral with a plurality of circuits strategy, and a decelerate and spiral descent strategy. Identifying a plurality of energy reduction may further comprise identifying each strategy from the plurality of energy reduction strategies and the detailed maneuver information associated with each identified strategy for which the starting point speed and starting point altitude can be achieved in the region of opportunity. The detailed maneuver information may comprise a specific energy reduction maneuver, a speed mode, a speed, and an amount of opportunity region used for the strategy. The speed mode may be one of: best gliding speed, max sink rate speed, max angle speed, pilot entered speed, max flyable speed, and optimum speed. The method may further comprise: receiving flight crew selection of one of the plurality of identified strategies for implementation; and modifying a flight plan with flight plan modifications to implement the strategy selected for implementation. The method may be implemented by a personal electronic device, electronic flight bag, tablet computer, or other computing device external to an aircraft flight management system that is configured to send the flight plan modifications to the aircraft flight management system for implementation. The method may be implemented by an aircraft flight management system that is configured to modify a flight plan in the aircraft flight management system with the flight plan modifications for implementation. The method may further comprise receiving flight crew input that interactively modifies an energy reduction strategy before final selection through a user interface (e.g., expand, decrease the opportunity region, speed mode selection etc.) and providing feedback indicating whether safe flight is achievable with the modifications.

In another embodiment, an automatic diversion management system on-board an aircraft is provided. The diversion management system is configured to: identify a potential diversion airport from nearby airports; determine a starting point for a stable landing at the potential diversion airport; determine a starting point altitude and a starting point speed for the aircraft to reach by the starting point for the stable landing; identify a region of opportunity for adjusting the speed and altitude of the aircraft to the starting point altitude and the starting point speed, wherein the region of opportunity is a region between the aircraft location and the starting point for the stable landing; and identify a plurality of potential vertical strategies for reaching the starting point altitude and the starting point speed while in the region of opportunity based on a speed mode for use by the aircraft during the stable approach. The speed mode may be one of: best gliding speed, max sink rate speed, max angle speed, pilot entered speed, max flyable speed, and optimum speed. The potential vertical strategies may include a plurality of: level deceleration, direct descent, spiral with one circuit, spiral with a plurality of circuits, decelerate and spiral descent strategies. The diversion management system is further configured to: evaluate the plurality of potential vertical strategies; identify, from the evaluation of the plurality of potential vertical strategies, one or more prospective strategies that are estimated to result in the aircraft reaching the starting point altitude and the starting point speed while in the region of opportunity; cause a graphical user interface (GUI) to depict the identified one or more prospective strategies on a flight deck display; receive, from flight crew via the graphical display, a selection of one of the prospective strategies; and modify the flight plan to implement the selected strategy.

In another embodiment, an automatic diversion management method on is provided. The method comprises: identifying a potential diversion airport from nearby airports; determining a starting point for a stable landing at the potential diversion airport; determining a starting point altitude and a starting point speed for the aircraft to reach by the starting point for the stable landing; identifying a region of opportunity for adjusting the speed and altitude of the aircraft to the starting point altitude and the starting point speed, wherein the region of opportunity is a region between the aircraft location and the starting point for the stable landing; and identifying a plurality of potential vertical strategies for reaching the starting point altitude and the starting point speed while in the region of opportunity based on a speed mode for use by the aircraft during the stable approach. The speed mode may be one of: best gliding speed, max sink rate speed, max angle speed, pilot entered speed, max flyable speed, and optimum speed. The potential vertical strategies may include a plurality of: level deceleration, direct descent, spiral with one circuit, spiral with a plurality of circuits, decelerate and spiral descent strategies. The method further comprises: evaluating the plurality of potential vertical strategies; identifying, from the evaluation of the plurality of potential vertical strategies, one or more prospective strategies that are estimated to result in the aircraft reaching the starting point altitude and the starting point speed while in the region of opportunity; causing a graphical user interface (GUI) to depict the identified one or more prospective strategies on a flight deck display; receiving, from flight crew via the graphical display, a selection of one of the prospective strategies; and modifying the flight plan to implement the selected strategy.

In another embodiment, non-transitory computer readable media encoded with programming instructions configurable to cause a processor to perform a method is provided. The programming instructions are configurable to cause the processor to perform a method comprising: determining a starting point location, altitude and airspeed for a stable approach for landing at a diversion location (e.g., a diversion airport); and determining a lateral and vertical strategy for reaching the starting point location and achieving the starting point altitude and airspeed. Determining the vertical strategy comprises identifying a region of opportunity for adjusting the speed and altitude of the aircraft to achieve the starting point altitude and airspeed, wherein the region of opportunity is a region between the current aircraft location and the starting point location for the stable approach; and identifying a plurality of energy reduction strategies for achieving the starting point altitude and airspeed while in the region of opportunity based on a speed mode for use by the aircraft during the stable approach. The method further comprises causing to be displayed, to flight crew on a graphic display device, a graphic display that lists for flight crew selection each of the plurality of identified strategies, detailed maneuver information for strategy implementation for each of the plurality of identified strategies, and costs for implementing each of the plurality of identified strategies including fuel consumption and time; and causing to be displayed, to flight crew on the graphic display device responsive to flight crew selection, a lateral view and vertical view of a proposed trajectory that graphically identifies a proposed lateral path and vertical path to a runway at the diversion location based on a selected identified strategy.

In another embodiment, non-transitory computer readable media encoded with programming instructions configurable to cause a processor to perform a method is provided. The programming instructions are configurable to cause the processor to perform a method comprising: identifying a potential diversion airport from nearby airports; determining a starting point for a stable landing at the potential diversion airport; determining a starting point altitude and a starting point speed for the aircraft to reach by the starting point for the stable landing; identifying a region of opportunity for adjusting the speed and altitude of the aircraft to the starting point altitude and the starting point speed, wherein the region of opportunity is a region between the aircraft location and the starting point for the stable landing; and identifying a plurality of potential vertical strategies for reaching the starting point altitude and the starting point speed while in the region of opportunity based on a speed mode for use by the aircraft during the stable approach. The speed mode may be one of: best gliding speed, max sink rate speed, max angle speed, pilot entered speed, max flyable speed, and optimum speed. The potential vertical strategies may include a plurality of: level deceleration, direct descent, spiral with one circuit, spiral with a plurality of circuits, decelerate and spiral descent strategies. The method further comprises: evaluating the plurality of potential vertical strategies; identifying, from the evaluation of the plurality of potential vertical strategies, one or more prospective strategies that are estimated to result in the aircraft reaching the starting point altitude and the starting point speed while in the region of opportunity; causing a graphical user interface (GUI) to depict the identified one or more prospective strategies on a flight deck display; receiving, from flight crew via the graphical display, a selection of one of the prospective strategies; and modifying the flight plan to implement the selected strategy.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A processor-implemented energy reduction system for generating a graphic display window for displaying a plurality of alternative energy reduction strategies on a display device on-board an aircraft, the energy reduction system comprising a controller comprising one or more processors configured by programming instructions on non-transitory computer readable media, the controller configured to:

determine a starting point location, altitude and airspeed for a stable approach for landing at a diversion location;

determine a lateral and vertical strategy for reaching the starting point location and achieving the starting point altitude and airspeed, wherein to determine the vertical strategy the controller is further configured to:

identify a region of opportunity for adjusting the speed and altitude of the aircraft to achieve the starting point altitude and airspeed, wherein the region of opportunity is a region between the current aircraft location and the starting point location for the stable approach; and identify a plurality of energy reduction strategies for achieving the starting point altitude and airspeed while in the region of opportunity based on a speed mode for use by the aircraft during the stable approach;

generate, for display on the graphic display device, a first graphic display window having a plurality of columns and rows, the first graphic display window listing in separate rows in a first column an identifier for the plurality of identified strategies, detailed maneuver information for each of the plurality of identified strategies in separate rows in a second column wherein the detailed maneuver information includes a plurality of maneuvers to be performed and an order in which to perform the maneuvers to achieve the starting point altitude and airspeed while in the region of opportunity, and costs for implementing each of the plurality of identified strategies in separate rows in a third column including fuel consumption and time, wherein each row contains the identifier for an identified strategy in the first column, the detailed maneuver information for the identified strategy in the second column, and the cost for implementing the identified strategy in the third column, wherein the first graphic display page further includes an energy reduction strategy selection graphical element corresponding to each identified strategy;

display the first graphic display window on the graphic display device;

receive selection of an identified strategy of the plurality of identified strategies via actuation of an energy reduction strategy selection graphical element corresponding to a selected strategy;

generate, for display on the graphic display device responsive to flight crew selection of an identified strategy, a second graphic display window having a first window pane for displaying a lateral view of a proposed trajectory that graphically illustrates the plurality of maneuvers and the order in which to perform the maneuvers for the selected identified strategy on a proposed lateral path and a second window pane for displaying a vertical view of the proposed trajectory that graphically illustrates the plurality of maneuvers and the order in which to perform the maneuvers for the selected identified strategy on a proposed vertical path to a runway at the diversion location; and display the second graphic display window on the graphic display device.

2. The energy reduction system of claim 1, wherein the stable approach comprises a DEST-APPR-STAR (destination, approach, standard terminal arrival route).

3. The energy reduction system of claim 1, wherein to identify a plurality of energy reduction strategies the controller is configured to:

calculate whether the starting point speed and starting point altitude can be achieved in the region of opportunity using each of a plurality of energy reduction strategies and calculate detailed maneuver information associated with each strategy that allows the starting point speed and starting point altitude to be achieved in the region of opportunity, wherein the plurality of energy reduction strategies include a level deceleration strategy, a direct descent strategy, a spiral with one circuit strategy, a spiral with a plurality of circuits strategy, and a decelerate and spiral descent strategy; and identify each strategy from the plurality of energy reduction strategies and the detailed maneuver information associated with each identified strategy for which the starting point speed and starting point altitude can be achieved in the region of opportunity.

4. The energy reduction system of claim 1, wherein the detailed maneuver information comprises a specific energy reduction maneuver, a speed mode, a speed, and an amount of opportunity region used for the strategy.

5. The energy reduction system of claim 1, wherein the speed mode is one of:

best gliding speed, max sink rate speed, max angle speed, pilot entered speed, max flyable speed, and optimum speed.

6. The energy reduction system of claim 1, wherein the controller is further configured to:

receive flight crew selection of one of the plurality of identified strategies for implementation; and modify a flight plan with flight plan modifications to implement the strategy selected for implementation.

7. The energy reduction system of claim 6, wherein the energy reduction system is implemented by a personal electronic device, electronic flight bag, tablet computer, or other computing device external to an aircraft flight management system and the controller is configured to send the flight plan modifications to the aircraft flight management system for implementation.

8. The energy reduction system of claim 6, wherein the energy reduction system is implemented by an aircraft flight management system and the controller is configured to modify a flight plan in the aircraft flight management system with the flight plan modifications for implementation.

9. A processor-implemented method in an aircraft for generating a graphic display window for displaying a plurality of alternative energy reduction strategies on a display device, the method comprising:

determining a starting point location, altitude and airspeed for a stable approach for landing at a diversion location;

determining a lateral and vertical strategy for reaching the starting point location and achieving the starting point altitude and airspeed, the determining the vertical strategy comprising:

identifying a region of opportunity for adjusting the speed and altitude of the aircraft to achieve the starting point altitude and airspeed, wherein the region of opportunity is a region between the current aircraft location and the starting point location for the stable approach; and identifying a plurality of energy reduction strategies for achieving the starting point altitude and airspeed while in the region of opportunity based on a speed mode for use by the aircraft during the stable approach;

generating for displaying on the graphic display device, a first graphic display window having a plurality of columns and rows, the first graphic display window listing in separate rows in a first column an identifier for the plurality of identified strategies, detailed maneuver information for each of the plurality of identified strategies in separate rows in a second column wherein the detailed maneuver information includes a plurality of maneuvers to be performed and an order in which to perform the maneuvers to achieve the starting point altitude and airspeed while in the region of opportunity, and costs for implementing each of the plurality of identified strategies in separate rows in a third column including fuel consumption and time, wherein each row contains the identifier for an identified strategy in the first column, the detailed maneuver information for the identified strategy in the second column, and the cost for implementing the identified strategy in the third column, wherein the first graphic display page further includes an energy reduction strategy selection graphical element corresponding to each identified strategy;

displaying the first graphic display window on the graphic display device;

receiving selection of an identified strategy of the plurality of identified strategies via actuation of an energy reduction strategy selection graphical element corresponding to a selected strategy;

generating for displaying on the graphic display device responsive to flight crew selection of an identified strategy, a second graphic display window having a first window pane for displaying a lateral view of a proposed trajectory that graphically illustrate the plurality of maneuvers and the order in which to perform the maneuvers for the selected identified strategy on a proposed lateral path and a second window pane for displaying a vertical view of the proposed trajectory that graphically illustrates the plurality of maneuvers and the order in which to perform the maneuvers for the selected identified strategy on a proposed vertical path to a runway at the diversion location; and displaying the second graphic display window on the graphic display device.

10. The method of claim 9, wherein the stable approach comprises a DEST-APPR-STAR (destination, approach, standard terminal arrival route).

11. The method of claim 9, wherein the identifying a plurality of energy reduction strategies comprises:

calculating whether the starting point speed and starting point altitude can be achieved in the region of opportunity using each of a plurality of energy reduction strategies and calculating detailed maneuver information associated with each strategy that allows the starting point speed and starting point altitude to be achieved in the region of opportunity, wherein the plurality of energy reduction strategies include a level deceleration strategy, a direct descent strategy, a spiral with one circuit strategy, a spiral with a plurality of circuits strategy, and a decelerate and spiral descent strategy; and identifying each strategy from the plurality of energy reduction strategies and the detailed maneuver information associated with each identified strategy for which the starting point speed and starting point altitude can be achieved in the region of opportunity.

12. The method of claim 9, wherein the detailed maneuver information comprises a specific energy reduction maneuver, a speed mode, a speed, and an amount of opportunity region used for the strategy.

13. The method of claim 9, wherein the speed mode is one of: best gliding speed, max sink rate speed, max angle speed, pilot entered speed, max flyable speed, and optimum speed.

14. The method of claim 9, further comprising:
receiving flight crew selection of one of the plurality of identified strategies for implementation; and
modifying a flight plan with flight plan modifications to implement the strategy selected for implementation.

15. The method of claim 14, wherein the method is implemented by a personal electronic device, electronic flight bag, tablet computer, or other computing device external to an aircraft flight management system that is configured to send the flight plan modifications to the aircraft flight management system for implementation.

16. The method of claim 14, wherein the method is implemented by an aircraft flight management system that is configured to modify a flight plan in the aircraft flight management system with the flight plan modifications for implementation.

17. Non-transitory computer readable media encoded with programming instructions configurable to cause a processor in an aircraft to perform a method during flight, the method comprising:
determining a starting point location, altitude and airspeed for a stable approach for landing at a diversion location;
determining a lateral and vertical strategy for reaching the starting point location and achieving the starting point altitude and airspeed, the determining the vertical strategy comprising:
identifying a region of opportunity for adjusting the speed and altitude of the aircraft to achieve the starting point altitude and airspeed, wherein the region of opportunity is a region between the current aircraft location and the starting point location for the stable approach; and
identifying a plurality of energy reduction strategies for achieving the starting point altitude and airspeed while in the region of opportunity based on a speed mode for use by the aircraft during the stable approach;
generating, for displaying, on a graphic display device, a first graphic display window having a plurality of columns and rows, the first graphic display window listing in separate rows in a first column an identifier for the plurality of identified strategies, detailed maneuver information for each of the plurality of identified strategies in separate rows in a second column wherein the detailed maneuver information includes a plurality of maneuvers to be performed and an order in which to perform the maneuvers to achieve the starting point altitude and airspeed while in the region of opportunity, and costs for implementing each of the plurality of identified strategies in separate rows in a third column including fuel consumption and time, wherein each row contains the identifier for an identified strategy in the first column, the detailed maneuver information for the identified strategy in the second column, and the cost for implementing the identified strategy in the third column, wherein the first graphic display page further includes an energy reduction strategy selection graphical element corresponding to each identified strategy;
displaying the first graphic display window on the graphic display device;
receiving selection of an identified strategy of the plurality of identified strategies via actuation of an energy reduction strategy selection graphical element corresponding to a selected strategy;
generating, for displaying on the graphic display device responsive to flight crew selection of an identified strategy, a second graphic display window having a first window pane for displaying a lateral view of a proposed trajectory that graphically illustrate the plurality of maneuvers and the order in which to perform the maneuvers for the selected identified strategy on a proposed lateral path and a second window pane for displaying a vertical view of the proposed trajectory that graphically illustrates the plurality of maneuvers and the order in which to perform the maneuvers for the selected identified strategy on a proposed vertical path to a runway at the diversion location; and
displaying the second graphic display window on the graphic display device.

18. The non-transitory computer readable media of claim 17, wherein the identifying a plurality of energy reduction strategies comprises:
calculating whether the starting point speed and starting point altitude can be achieved in the region of opportunity using each of a plurality of energy reduction strategies and calculating detailed maneuver information associated with each strategy that allows the starting point speed and starting point altitude to be achieved in the region of opportunity, wherein the plurality of energy reduction strategies include a level deceleration strategy, a direct descent strategy, a spiral with one circuit strategy, a spiral with a plurality of circuits strategy, and a decelerate and spiral descent strategy; and
identifying each strategy from the plurality of energy reduction strategies and the detailed maneuver information associated with each identified strategy for which the starting point speed and starting point altitude can be achieved in the region of opportunity.

19. The non-transitory computer readable media of claim 17, wherein the detailed maneuver information comprises a specific energy reduction maneuver, a speed mode, a speed, and an amount of opportunity region used for the strategy.

20. The non-transitory computer readable media of claim 17, wherein the processor in the aircraft is further configured to perform a method comprising:
receiving flight crew selection of one of the plurality of identified strategies for implementation; and
modifying a flight plan with flight plan modifications to implement the strategy selected for implementation.

* * * * *